US010170937B2

(12) United States Patent
Menegoli

(10) Patent No.: US 10,170,937 B2
(45) Date of Patent: Jan. 1, 2019

(54) DEVICES, SYSTEMS, AND METHODS FOR ADJUSTING OUTPUT POWER USING SYNCHRONOUS RECTIFIER CONTROL

(71) Applicant: QUALCOMM Incorporated, San Diego, CA (US)

(72) Inventor: Paolo Menegoli, San Jose, CA (US)

(73) Assignee: QUALCOMM Incorporated, San Diego, CA (US)

( * ) Notice: Subject to any disclaimer, the term of this patent is extended or adjusted under 35 U.S.C. 154(b) by 245 days.

(21) Appl. No.: 15/085,017

(22) Filed: Mar. 30, 2016

(65) Prior Publication Data
US 2017/0025897 A1  Jan. 26, 2017

Related U.S. Application Data

(60) Provisional application No. 62/196,865, filed on Jul. 24, 2015.

(51) Int. Cl.
*H02J 50/12* (2016.01)
*H02J 7/02* (2016.01)
(Continued)

(52) U.S. Cl.
CPC .............. *H02J 50/12* (2016.02); *H02J 7/025* (2013.01); *H02J 50/80* (2016.02);
(Continued)

(58) Field of Classification Search
CPC  H02J 5/005; H02J 7/025; H02J 17/00; H02N 2/008; H04B 5/0025–5/0093;
(Continued)

(56) References Cited

U.S. PATENT DOCUMENTS

2005/0288739 A1* 12/2005 Hassler, Jr. .......... A61N 1/3787
                                                          607/61
2006/0082323 A1*  4/2006 Boys ....................... H02J 5/005
                                                         315/209 R
(Continued)

FOREIGN PATENT DOCUMENTS

WO   WO-2011028956 A2   3/2011
WO   WO-2015069122 A1   5/2015
WO   WO-2015105925 A1   7/2015

OTHER PUBLICATIONS

International Search Report and Written Opinion—PCT/US2016/041933—ISA/EPO—dated Sep. 16, 2016.

*Primary Examiner* — Rexford Barnie
*Assistant Examiner* — Thai Tran
(74) *Attorney, Agent, or Firm* — Knobbe, Martens, Olson & Bear, LLP

(57) ABSTRACT

In one aspect, an apparatus for wireless receiving power comprises a receive circuit configured to receive wireless power via a magnetic field sufficient to power or charge a load. The apparatus further comprises a tuning circuit comprising a variable reactive element, coupled to the receive circuit, and configured to detune the receive circuit away from a resonant frequency to adjust an output power level to a first output power level. The apparatus comprises a rectifier, comprising a switch, coupled to the receive circuit and configured to rectify an alternating current to a direct current for supplying power to the load. The apparatus comprises a drive circuit configured to actuate the switch when a current through the switch satisfies a first non-zero current value and adjust the first non-zero current value to a second non-zero value to adjust the first output power level to a second output power level.

30 Claims, 11 Drawing Sheets

(51) Int. Cl.
*H02M 7/217* (2006.01)
*H04B 5/00* (2006.01)
*H02M 3/335* (2006.01)
*H02M 7/219* (2006.01)
*H02J 50/80* (2016.01)
*H02M 7/48* (2007.01)
*H02M 1/00* (2006.01)

(52) U.S. Cl.
CPC ....... *H02M 3/33592* (2013.01); *H02M 7/219* (2013.01); *H02M 7/48* (2013.01); *H04B 5/0037* (2013.01); *H02M 2001/0058* (2013.01); *H02M 2007/4818* (2013.01); *Y02B 70/1433* (2013.01); *Y02B 70/1441* (2013.01); *Y02B 70/1475* (2013.01); *Y02B 70/1491* (2013.01)

(58) Field of Classification Search
CPC ............... B60L 5/005; B60L 11/182; B60L 11/1829–11/1831; Y02T 90/122; H01F 27/006; H01F 27/02; H01F 38/14; H01F 2038/143–2038/146; H01R 13/6633; A61B 1/00029; A61N 1/3787

USPC ........................................... 307/104; 320/108
See application file for complete search history.

(56) References Cited

U.S. PATENT DOCUMENTS

| | | | |
|---|---|---|---|
| 2007/0109708 A1* | 5/2007 | Hussman | H02J 1/00 361/113 |
| 2011/0046699 A1* | 2/2011 | Mazanec | A61N 1/3787 607/61 |
| 2011/0134673 A1 | 6/2011 | Ho et al. | |
| 2012/0161696 A1* | 6/2012 | Cook | B60L 11/182 320/108 |
| 2013/0033118 A1 | 2/2013 | Karalis et al. | |
| 2013/0082538 A1* | 4/2013 | Wambsganss | H01F 38/14 307/104 |
| 2014/0183972 A1 | 7/2014 | Endo et al. | |
| 2014/0265610 A1 | 9/2014 | Bakker et al. | |
| 2015/0076920 A1 | 3/2015 | Zargham et al. | |
| 2015/0255989 A1 | 9/2015 | Walley et al. | |
| 2015/0263511 A1 | 9/2015 | Sandner et al. | |
| 2016/0299521 A1 | 10/2016 | Akram et al. | |

* cited by examiner

DEVICES, SYSTEMS, AND METHODS FOR ADJUSTING OUTPUT POWER USING SYNCHRONOUS RECTIFIER CONTROL

CROSS REFERENCE TO RELATED APPLICATIONS

This application claims benefit under 35 U.S.C. § 119(e) to U.S. Provisional Patent Application No. 62/196,865 entitled "DEVICES, SYSTEMS, AND METHODS FOR ADJUSTING OUTPUT POWER USING SYNCHRONOUS RECTIFIER CONTROL" filed on Jul. 24, 2015; the disclosure of which is hereby incorporated by reference in its entirety.

FIELD

This application is generally related to wireless power charging of chargeable devices, and more particularly for using synchronous rectifier control for adjusting output power.

BACKGROUND

An increasing number and variety of electronic devices are powered via rechargeable batteries. Such devices include mobile phones, portable music players, laptop computers, tablet computers, computer peripheral devices, communication devices (e.g., Bluetooth devices), digital cameras, hearing aids, and the like. While battery technology has improved, battery-powered electronic devices increasingly require and consume greater amounts of power, thereby often requiring recharging. Rechargeable devices are often charged via wired connections through cables or other similar connectors that are physically connected to a power supply. Cables and similar connectors may sometimes be inconvenient or cumbersome and have other drawbacks. Wireless charging systems that are capable of transferring power in free space to be used to charge rechargeable electronic devices or provide power to electronic devices may overcome some of the deficiencies of wired charging solutions. As such, wireless power transfer systems and methods that efficiently and safely transfer power to electronic devices are desirable.

SUMMARY

Various implementations of systems, methods and devices within the scope of the appended claims each have several aspects, no single one of which is solely responsible for the desirable attributes described herein. Without limiting the scope of the appended claims, some prominent features are described herein.

Details of one or more implementations of the subject matter described in this specification are set forth in the accompanying drawings and the description below. Other features, aspects, and advantages will become apparent from the description, the drawings, and the claims. Note that the relative dimensions of the following figures may not be drawn to scale.

One aspect of the subject matter described in the disclosure provides an apparatus for wirelessly receiving power. The apparatus includes a receive circuit configured to receive wireless power via a magnetic field sufficient to power or charge a load. The apparatus further includes a tuning circuit comprising a variable reactive element, coupled to the receive circuit, and configured to detune the receive circuit away from a resonant frequency to adjust an output power level to a first output power level. The apparatus further includes a rectifier electrically coupled to the receive circuit and configured to rectify an alternating current (AC) signal, generated in the receive circuit, to a direct current (DC) signal for supplying power to the load, the rectifier comprising a switch. The apparatus further includes a drive circuit configured to actuate the switch when a current through the switch satisfies a first non-zero current value. The drive circuit further configured to adjust the first non-zero current value to a second non-zero value to adjust the first output power level to a second output power level.

Another aspect of the subject matter described in the disclosure provides an implementation of a method of wirelessly receiving power from a transmitter. The method includes receiving, via a receive circuit, wireless power via a magnetic field sufficient to power or charge a load. The method further includes detuning, via a variable reactive element coupled to the receive circuit, the receive circuit away from a resonant frequency to adjust an output power level to a first output power level. The method further includes rectifying, via a rectifier, an alternating current (AC) signal generated by the magnetic field to a direct current (DC) signal for supplying power to the load, the rectifier comprising a switch. The method further includes actuating the switch when a current through the switch satisfies a first non-zero current value. The method further includes adjusting the first non-zero current value to a second non-zero value to adjust the first output power level to a second output power level.

Another aspect of the subject matter described in the disclosure provides an apparatus for wirelessly receiving power. The apparatus includes means for receiving wireless power via a magnetic field sufficient to power or charge a load. The apparatus further includes means for detuning the receive circuit away from a resonant frequency to adjust an output power level to a first output power level. The apparatus further includes means for rectifying, via a rectifier, an alternating current (AC) signal generated by the magnetic field to a direct current (DC) signal for supplying power to the load, the rectifier comprising a switch. The apparatus further includes means for actuating the switching means when a current through the switching means satisfies a first non-zero current value. The apparatus further includes means for adjusting the first non-zero current value to a second non-zero value to adjust the first output power level to a second output power level.

Another aspect of the subject matter described in the disclosure provides a non-transitory computer-readable medium comprising code that, when executed, causes an apparatus to receive, via a receive circuit, wireless power via a magnetic field sufficient to power or charge a load. The code, when executed, further causes the apparatus to detune the receive circuit away from a resonant frequency to adjust an output power level to a first output power level. The code, when executed, further causes the apparatus to rectify, via a rectifier, an alternating current (AC) signal generated by the magnetic field to a direct current (DC) signal for supplying power to the load, the rectifier comprising a switch. The code, when executed, further causes the apparatus to actuate the switch when a current through the switch satisfies a first non-zero current value. The code, when executed, further causes the apparatus to adjust the first non-zero current value to a second non-zero value to adjust the first output power level to a second output power level.

Figure 1:
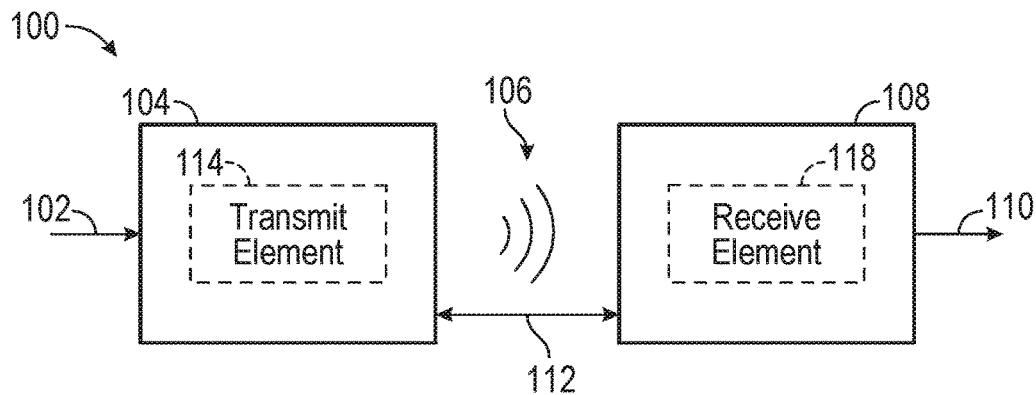
FIG. 1 is a functional block diagram of an exemplary wireless power transfer system, in accordance with exemplary embodiments.

The various features illustrated in the drawings may not be drawn to scale. Accordingly, the dimensions of the various features may be arbitrarily expanded or reduced for clarity. In addition, some of the drawings may not depict all of the components of a given system, method or device. Finally, like reference numerals may be used to denote like features throughout the specification and figures.

DETAILED DESCRIPTION

In the following description, for purposes of explanation, numerous examples and specific details are set forth in order to provide a thorough understanding of the present disclosure. It will be evident, however, to one skilled in the art that the present disclosure as expressed in the claims may include some or all of the features in these examples, alone or in combination with other features described below, and may further include modifications and equivalents of the features and concepts described herein.

Wireless power transfer may refer to transferring any form of energy associated with electric fields, magnetic fields, electromagnetic fields, or otherwise from a transmitter to a receiver without the use of physical electrical conductors (e.g., power may be transferred through free space). The power output into a wireless field (e.g., a magnetic field or an electromagnetic field) may be received, captured by, or coupled by a "power receiving element" to achieve power transfer.

FIG. 1 is a functional block diagram of a wireless power transfer system 100, in accordance with an illustrative embodiment. Input power 102 may be provided to a transmitter 104 from a power source (not shown in this figure) to generate a wireless (e.g., magnetic or electromagnetic) field 105 for performing energy transfer. A receiver 108 may couple to the wireless field 105 and generate output power 110 for storing or consumption by a device (not shown in this figure) coupled to the output power 110. The transmitter 104 and the receiver 108 may be separated by a distance 112. The transmitter 104 may include a power transmitting element 114 for transmitting/coupling energy to the receiver 108. The receiver 108 may include a power receiving element 118 for receiving or capturing/coupling energy transmitted from the transmitter 104.

In one illustrative embodiment, the transmitter 104 and the receiver 108 may be configured according to a mutual resonant relationship. When the resonant frequency of the receiver 108 and the resonant frequency of the transmitter 104 are substantially the same or very close, transmission losses between the transmitter 104 and the receiver 108 are reduced. As such, wireless power transfer may be provided over larger distances. Resonant inductive coupling techniques may thus allow for improved efficiency and power transfer over various distances and with a variety of inductive power transmitting and receiving element configurations.

In certain embodiments, the wireless field 105 may correspond to the "near field" of the transmitter 104 as will be further described below. The near-field may correspond to a region in which there are strong reactive fields resulting from the currents and charges in the power transmitting element 114 that minimally radiate power away from the power transmitting element 114. The near-field may correspond to a region that is within about one wavelength (or a fraction thereof) of the power transmitting element 114.

In certain embodiments, efficient energy transfer may occur by coupling a large portion of the energy in the wireless field 105 to the power receiving element 118 rather than propagating most of the energy in an electromagnetic wave to the far field.

In certain implementations, the transmitter 104 may output a time varying magnetic (or electromagnetic) field with a frequency corresponding to the resonant frequency of the power transmitting element 114. When the receiver 108 is within the wireless field 105, the time varying magnetic (or electromagnetic) field may induce a current in the power receiving element 118. As described above, if the power receiving element 118 is configured as a resonant circuit to resonate at the frequency of the power transmitting element 114, energy may be efficiently transferred. An alternating current (AC) signal induced in the power receiving element 118 may be rectified to produce a direct current (DC) signal that may be provided to charge or to power a load.

Figure 2:
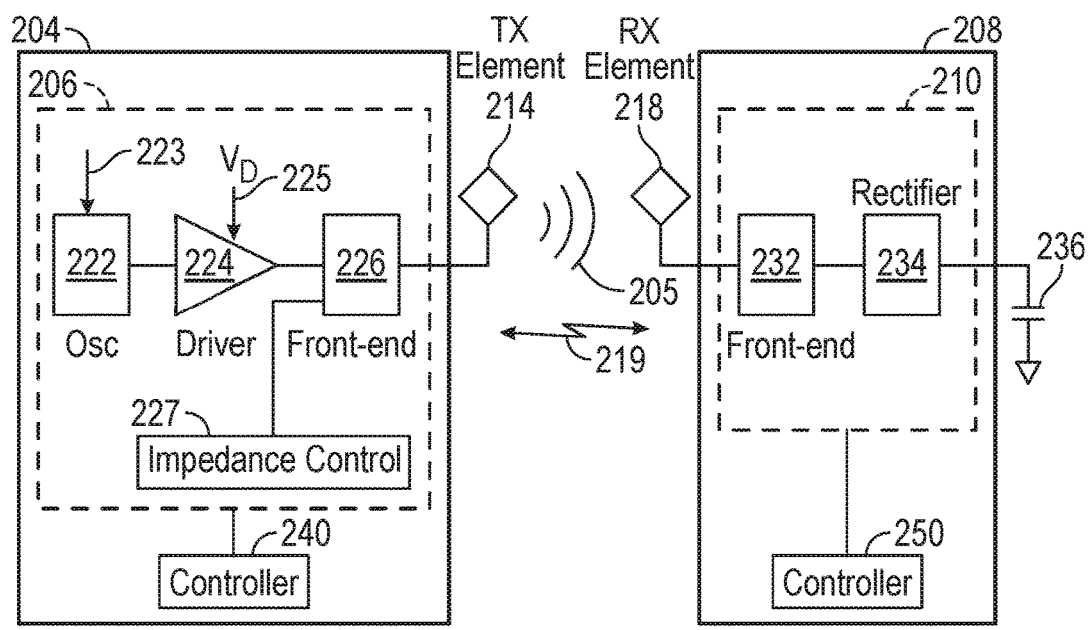
FIG. 2 is a functional block diagram of exemplary components that may be used in the wireless power transfer system of FIG. 1, in accordance with various exemplary embodiments.

FIG. 2 is a functional block diagram of a wireless power transfer system 200, in accordance with another illustrative embodiment. The system 200 may include a transmitter 204 and a receiver 208. The transmitter 204 (also referred to herein as power transmitting unit, PTU) may include transmit circuitry 206 that may include an oscillator 222, a driver circuit 224, a front-end circuit 226, and an impedance control module 227. The oscillator 222 may be configured to generate a signal at a desired frequency that may adjust in response to a frequency control signal 223. The oscillator 222 may provide the oscillator signal to the driver circuit 224. The driver circuit 224 may be configured to drive the power transmitting element 214 at, for example, a resonant frequency of the power transmitting element 214 based on an input voltage signal (VD) 225. The driver circuit 224 may be a switching amplifier configured to receive a square wave from the oscillator 222 and output a sine wave.

The front-end circuit 226 may include a filter circuit to filter out harmonics or other unwanted frequencies. The front-end circuit 226 may include a matching circuit to match the impedance of the transmitter 204 to the power transmitting element 214. As will be explained in more detail below, the front-end circuit 226 may include a tuning circuit to create a resonant circuit with the power transmitting element 214. As a result of driving the power transmitting element 214, the power transmitting element 214 may generate a wireless field 205 to wirelessly output power at a level sufficient for charging a battery 236, or otherwise powering a load. The impedance control module 227 may control the front-end circuit 226.

The transmitter 204 may further include a controller 240 operably coupled to the transmit circuitry 206 configured to control one or aspects of the transmit circuitry 206 or accomplish other operations relevant to managing the transfer of power. The controller 240 may be a micro-controller or a processor. The controller 240 may be implemented as an application-specific integrated circuit (ASIC). The controller 240 may be operably connected, directly or indirectly, to each component of the transmit circuitry 206. The controller 240 may be further configured to receive information from each of the components of the transmit circuitry 206 and perform calculations based on the received information. The controller 240 may be configured to generate control signals (e.g., signal 223) for each of the components that may adjust the operation of that component. As such, the controller 240 may be configured to adjust or manage the power transfer based on a result of the operations performed by it. The transmitter 204 may further include a memory (not shown) configured to store data, for example, such as instructions for causing the controller 240 to perform particular functions, such as those related to management of wireless power transfer.

The receiver 208 (also referred to herein as power receiving unit, PRU) may include receive circuitry 210 that may include a front-end circuit 232 and a rectifier circuit 234. The front-end circuit 232 may include matching circuitry to match the impedance of the receive circuitry 210 to the power receiving element 218. As will be explained below, the front-end circuit 232 may further include a tuning circuit to create a resonant circuit with the power receiving element 218. The rectifier circuit 234 may generate a DC power output from an AC power input to charge the battery 236, as shown in FIG. 2. The receiver 208 and the transmitter 204 may additionally communicate on a separate communication channel 219 (e.g., Bluetooth, Zigbee, cellular, etc.). The receiver 208 and the transmitter 204 may alternatively communicate via in-band signaling using characteristics of the wireless field 205.

The receiver 208 may be configured to determine whether an amount of power transmitted by the transmitter 204 and received by the receiver 208 is appropriate for charging the battery 236. Transmitter 204 may be configured to generate a predominantly non-radiative field with a direct field coupling coefficient (k) for providing energy transfer. Receiver 208 may directly couple to the wireless field 205 and may generate an output power for storing or consumption by a battery (or load) 236 coupled to the output or receive circuitry 210.

The receiver 208 may further include a controller 250 configured similarly to the transmit controller 240 as described above for managing one or more aspects of the wireless power receiver. The receiver 208 may further include a memory (not shown) configured to store data, for example, such as instructions for causing the controller 250 to perform particular functions, such as those related to management of wireless power transfer.

As discussed above, transmitter 204 and receiver 208 may be separated by a distance and may be configured according to a mutual resonant relationship to minimize transmission losses between the transmitter and the receiver.

Figure 3:
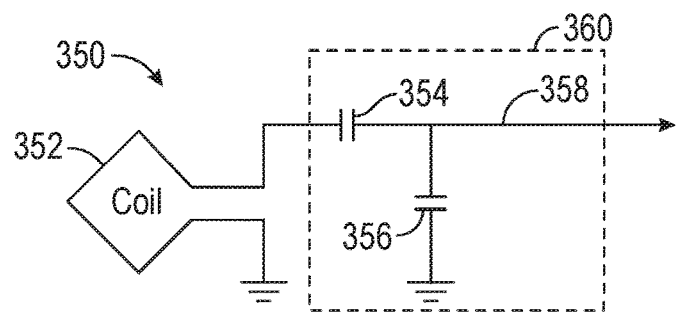
FIG. 3 is a schematic diagram of a portion of transmit circuitry or receive circuitry of FIG. 2 including a transmit or receive antenna, in accordance with exemplary embodiments.

FIG. 3 is a schematic diagram of a portion of the transmit circuitry 206 or the receive circuitry 210 of FIG. 2, in accordance with illustrative embodiments. As illustrated in FIG. 3, transmit or receive circuitry 350 may include a power transmitting or receiving element 352 and a tuning circuit 360. The power transmitting or receiving element 352 may also be referred to or be configured as an antenna or a "loop" antenna. The term "antenna" generally refers to a component that may wirelessly output or receive energy for coupling to another "antenna." The power transmitting or receiving element 352 may also be referred to herein or be configured as a "magnetic" antenna, or an induction coil, a resonator, or a portion of a resonator. The power transmitting or receiving element 352 may also be referred to as a coil or resonator of a type that is configured to wirelessly output or receive power. As used herein, the power transmitting or receiving element 352 is an example of a "power transfer component" of a type that is configured to wirelessly output and/or receive power. The power transmitting or receiving element 352 may include an air core or a physical core such as a ferrite core (not shown in this figure).

When the power transmitting or receiving element 352 is configured as a resonant circuit or resonator with tuning circuit 360, the resonant frequency of the power transmitting or receiving element 352 may be based on the inductance and capacitance. Inductance may be simply the inductance created by a coil or other inductor forming the power transmitting or receiving element 352. Capacitance (e.g., a capacitor) may be provided by the tuning circuit 360 to create a resonant structure at a desired resonant frequency. As a non-limiting example, the tuning circuit 360 may comprise a capacitor 354 and a capacitor 356 may be added to the transmit and/or receive circuitry 350 to create a resonant circuit.

The tuning circuit 360 may include other components to form a resonant circuit with the power transmitting or receiving element 352. As another non-limiting example, the tuning circuit 360 may include a capacitor (not shown) placed in parallel between the two terminals of the circuitry 350. Still other designs are possible. In some embodiments, the tuning circuit in the front-end circuit 226 may have the same design (e.g., 360) as the tuning circuit in front-end circuit 232. In other embodiments, the front-end circuit 226 may use a tuning circuit design different than in the front-end circuit 232.

For power transmitting elements, the signal 358, with a frequency that substantially corresponds to the resonant frequency of the power transmitting or receiving element 352, may be an input to the power transmitting or receiving element 352. For power receiving elements, the signal 358, with a frequency that substantially corresponds to the resonant frequency of the power transmitting or receiving element 352, may be an output from the power transmitting or receiving element 352. Embodiments and descriptions provided herein may be applied to resonant and non-resonant implementations (e.g., resonant and non-resonant circuits for power transmitting or receiving elements and resonant and non-resonant systems).

Figure 4:
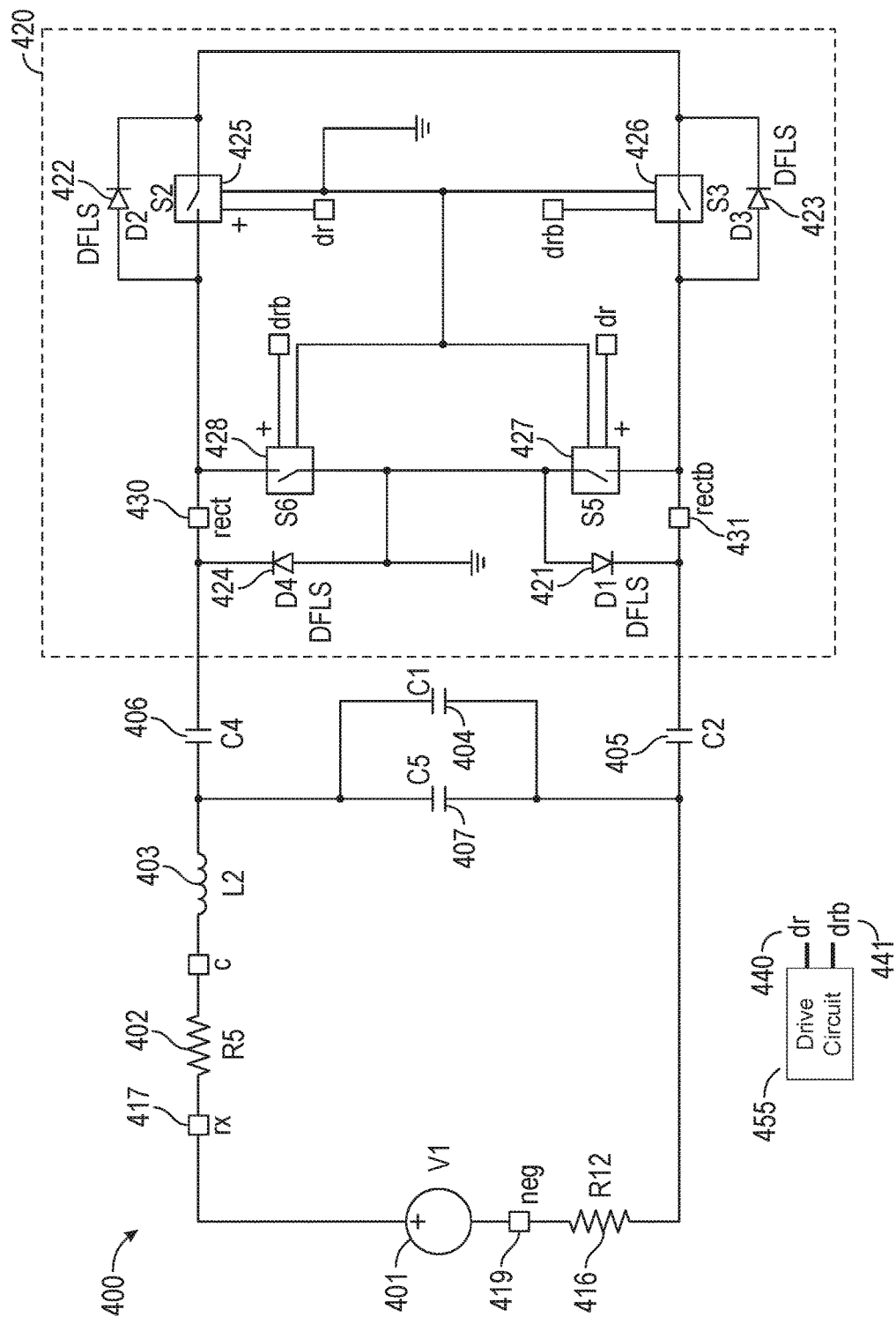
FIG. 4 is a diagram of an exemplary power receiving element circuitry in accordance with an embodiment.

FIG. 4 is a diagram of an exemplary power receiving element structure 400 that includes a synchronous rectifier 420. As shown, the power receiving element structure 400 comprises a voltage source 401, a resistance R5 402, a resistance R12 416, an inductor L2 403, capacitors C1 404, C2 405, C4 406, and C5 407. In the exemplary configuration shown in FIG. 4, the voltage source may have a sinusoidal voltage ranging from 0 to 4.243 V with a frequency of 6.78 MHz, the resistance R5 402 may have a resistance of 667 mΩ, the resistance R12 416 may have a resistance of 1 μΩ, the inductor L2 403 may have an inductance of 766 nH, capacitors C1 404, C2 405, C4 406, and C5 407 may have a capacitance of 50 pF, 1 nF, 1 nF, and 150 pF respectively. In some aspects, the resistances shown in FIG. 4 may represent intrinsic resistances of components of the power receiving element structure 400 rather than separate resistances. In some embodiments, the voltage source 401 merely is present to represent a time-varying induced voltage in response to an externally generated magnetic field during operation. In some aspects, a voltage across the voltage source may be measured at terminals "rx" 417 and "neg" 419. In some aspects, a resonant circuit of the power receiving element structure 400 may comprise the inductor L2 403 and capacitors C1 404 and C5 407. The power receiving element structure 400 also comprises the rectifier 420 that comprises diodes D1 421, D2 422, D3 423, and D4 424 (collectively, D1-D4) and switches S2 425, S3 426, S5 427, and S6 428 (collectively, S2-S3 and S5-S6). In some embodiments, the power receiving element structure 400 may comprise a drive circuit 455 configured to actuate the switches via signals "dr" 440 and "drb" 441. In some aspects, the diodes D1-D4 represent actual diodes represent in the rectifier 420. In some aspects, the diodes D1-D4 represent body diodes of the switches S2-S3 and S5-S6. While the rectifier 420 comprises a full bridge rectifier, in other aspects a half-bridge rectifier may be used. The switches S2-S3 and S5-S6 may comprise a transistor (e.g., MOSFET, JFET, etc.) or any other type of switch. In some embodiments, the rectifier 420 may illustrate an exemplary configuration of the rectifier circuit 234 of FIG. 2. The specific values described herein relating to the components of FIG. 4 are merely exemplary and non-limiting.

In some embodiments, synchronous rectification of the rectifier 420 can be obtained by operating the switches S2-S3 and S5-S6 in ZVS (zero voltage switching) at turn on and in ZCS (zero current switching) at turn off. When using the rectifier 420, the operation of the switches S2-S3 and S5-S6 may be timed and controlled to match the input signal from the voltage source 401.

In some embodiments, it may be beneficial to adjust the operation of the switches S2-S3 and S5-S6 such that the switches no longer operate at ZVS and/or ZCS. In particular, the turn off timing of the switches S2-S3 and S5-S6 may be varied or delayed to allow a reversal of the current in the switches S2-S3 and S5-S6. In such embodiments, the current may initially flow into the load and for some time, prior to turn off, the current may flow from the load back into the resonating circuit (e.g., L2 403 and C1 404 and C5 407). This delay at turn off of the switches S2-S3 and S5-S6 may cause a change of effective impedance as seen looking into the rectifier and a shift of the current phase. In some aspects, for example if implemented in a closed loop embodiment, the power receiving element 400 may control the output power to the load by adjusting the timing or thresholds of the switches S2-S3 and S5-S6.

For example, in some embodiments a receive circuit may be configured to receive wireless power via a magnetic field sufficient to power or charge a load and may generate an alternating current (AC) signal such as the voltage source 401. The rectifier 420 may be electrically coupled to the receive circuit and configured to rectify the AC signal generated in the receive circuit to a direct current (DC) signal for supplying power to the load. The rectifier 420 comprises a switch (e.g., S2-S3 and S5-S6) and the drive circuit 455 configured to actuate the switch when a current through the switch satisfies a non-zero current value. In some aspects, the non-zero current value is a threshold value that signals the drive circuit to open or close the switch. In some aspects, the non-zero current value is a negative current value such that the direction current flows from the load back into the receive circuit for a period of time before the switch is opened. The drive circuit may adjust the non-zero current value to adjust an output power to the load. In some aspects, the drive circuit adjusts a magnitude of the non-zero current value based on feedback from the load regarding a desired output power level. In some aspects, the drive circuit determines the non-zero current value is satisfied through a current sensor or a comparator coupled to the switch(es) (e.g., S2-S3 and S5-S6).

Figure 5:
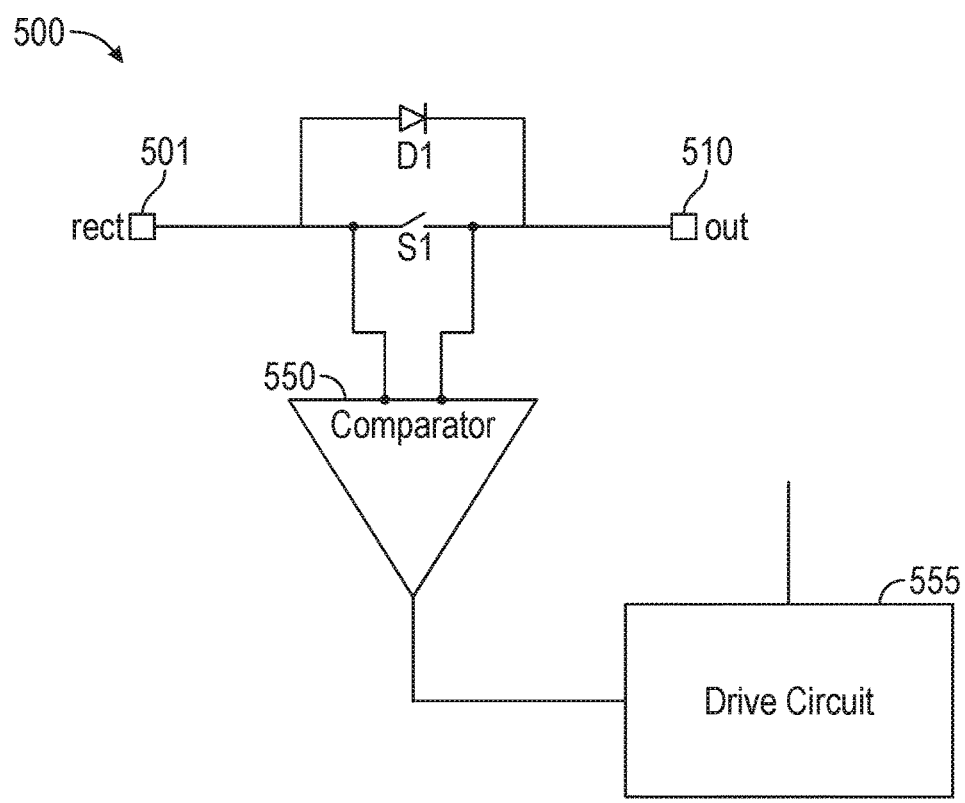
FIG. 5 is a diagram of a portion of exemplary switch circuitry which may be used in the power receiving element of FIG. 4.

FIG. 5 is a diagram of an exemplary switch circuitry 500 which may be included in the rectifier circuit 420 of FIG. 4. As shown in FIG. 5, the switch circuitry 500 comprises a switch S1 which has a parallel diode D1. The diode D1 may comprise a body diode of any MOS transistor. The switch circuitry 500 further comprises a comparator 550 across the switch S1 which compares a voltage of the terminals "rect" 501 and "out" 510 of the switch and a drive circuit 555 which sends a signal to the switch S1 to open or close the switch S1 when the voltage or current across the switch S1 reaches a threshold value. In some embodiments, the drive circuit 555 sends the signal to the terminals "dr" 440 and/or "drb" 441 (See FIG. 4) to actuate or activate the corresponding switch (e.g., S2-S3 and S5-S6). For example, in some aspects the switches S2 425 and S3 426 (and corresponding diodes D2 422 and D3 423) of FIG. 4 may be replaced with the switch circuitry 500 which comprises the comparator 550 coupled to the drive circuit 555 which signals "dr" 440 and/or "drb" 441 to actuate the switches S2 425 and S3 426. In other aspects, the switches S5 427 and S6 428 (and corresponding diodes D1 421 and D4 424) may be replaced with the switch circuitry 500. As described above, in a synchronous rectifier circuit, the comparator 550 may send a signal to turn on the switch S1 (i.e., close the switch) when the voltages of the terminals rect 501 and out 510 are equal (e.g., ZVS). Additionally, the comparator 550 may send a signal to turn off the switch S1 (i.e., open the switch) when the current of the terminals rect 501 and out 510 are equal (e.g., ZCS).

As described above, it may be desirable to adjust the operation of the switch S1 to adjust an output power delivered to the load (e.g., battery 236 of FIG. 2). For example, a hysteresis may be added to the comparator 550, so that the turn on of the switch S1 occurs when the voltage of terminal rect 501 is not zero. In some aspects, the hysteresis comprises a threshold voltage or current for determining when or under what conditions to actuate the switch S1. For instance, a threshold that the comparator 550 uses to turn on the switch S1 may occur when there is a 30 mV greater voltage in the rect terminal 501 than the voltage of the out terminal 510 (i.e., $V_{rect}-V_{out}=30$ mV). In this example, the hysteresis would be 30 mV. In some aspects, the comparator 550 determines that the voltage in the rect terminal 501 is 30 mV greater than the voltage of the out terminal 510 and signals the drive circuit 555 to turn on the switch S1. Accordingly, the switch S1 is turned on when the voltage across it is different than zero (non ZVS). Similarly, a hysteresis (e.g., −30 mV) may be added such that the turn off of the switch S1 occurs when the voltage of terminal rect 501 is smaller than the voltage of terminal out 510 (e.g., $V_{rect}-V_{out}=-30$ mV). Thus, the switch S1 may be turned off when the current flowing through it is different than zero or a negative value.

In some aspects, adding a hysteresis to the switch S1 may be equivalent to delaying the turn on or turn off of the switch S1, thus effectively shifting the phase of the current with respect to the phase of the voltage. The hysteresis implementation of FIG. 5 provides one mechanisms for sensing current/adjusting threshold for controlling a switch. In some aspects, any type of current sensing circuit or other scheme may be used to sense the current through the switch S1 and determine how to adjust the timing of the switch S1 based on the current. For example, in one aspect the switch S1 may be coupled to a current sensor configured to sense a current through the switch. The sensor may be further configured to adjust the timing of the switched S1 based on the sensed current.

In some aspects, the power receiving element 400 may comprise an output unit to measure a level of output power provided to the load. In some aspects, a controller the power receiving element 400 or of the load may provide feedback to the rectifier 420. In some aspects, the feedback may comprise a desired level of power request or a difference between the output power and a desired output power. In some aspects, the rectifier or a controller may then determine how to adjust the timing of the switch(es) (e.g., S2-S3 and S5-6) or the hysteresis of the comparator 550 based on the feedback about the desired output power to be maintained or adjusted. As described above, the rectifier 420 or controller may then dynamically adjust the timing of the switches (e.g., S2-S3 and S5-6) threshold (hysteresis) based on the determined adjustment to either maintain the desired output power level or adjust the desired output power level.

In other embodiments, when the resonant circuit of the power receiving element 400 operates with a reactance shift by using a tuning circuit (e.g., tuning capacitor, transcap, variable capacitor, variable inductor, etc.), the effect of the hysteresis, or the adjustment of the timing of the switches, may have an increased effect on the output power at induced voltages higher or equal to the output voltage than compared to resonant circuits operating at resonance. As described above, at low induced voltages and without any significant reactance shift, the power to the load is increased by increasing the amount of hysteresis. In contrast, with higher induced voltages and a given reactance shift realized by the tuning circuit (e.g., transcap de-tuning), the amount of power transferred to the load (e.g., battery 236 of FIG. 2) is decreased by increasing the hysteresis level.

Figure 6:
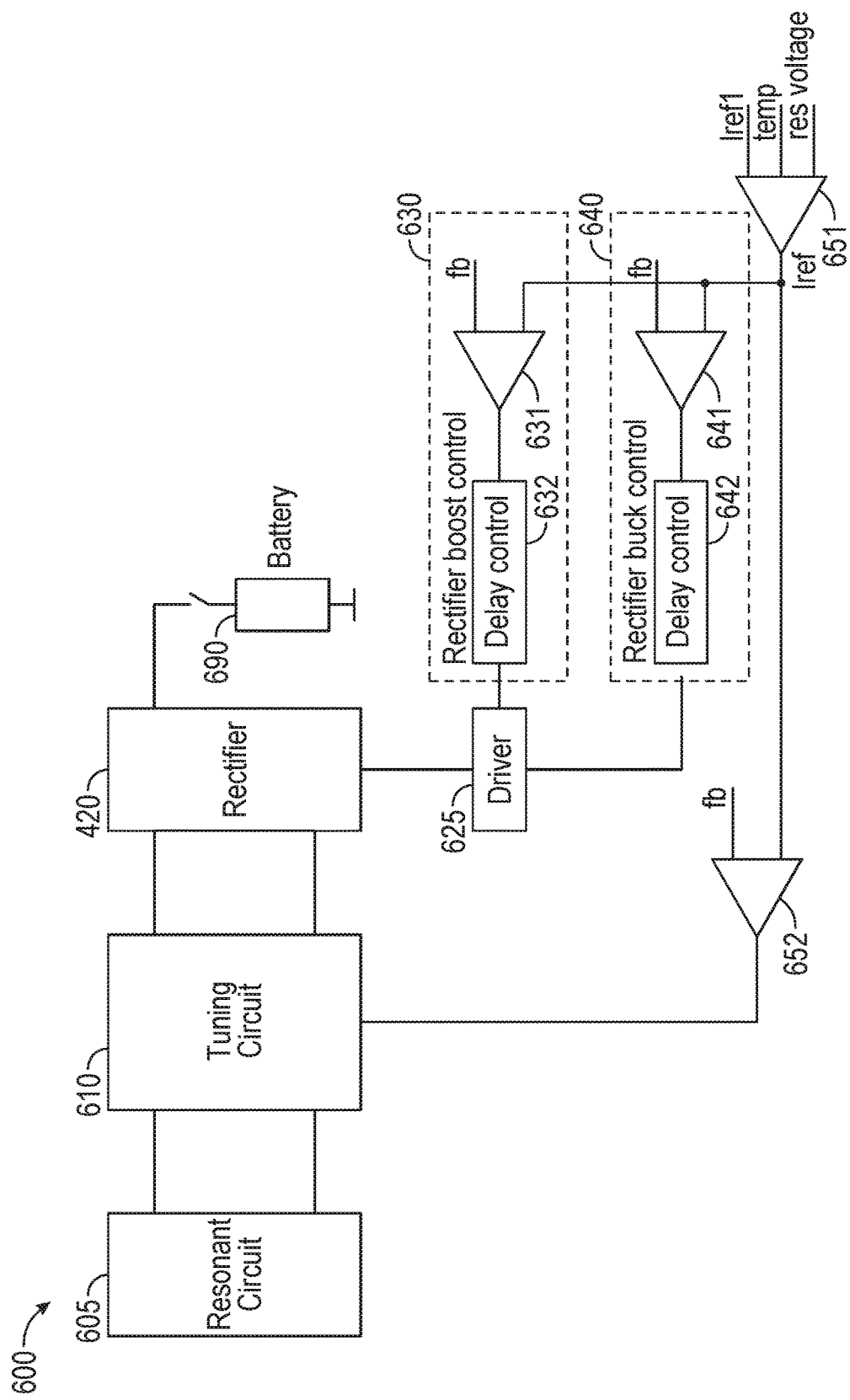
FIG. 6 is a diagram of an exemplary power receiving element that includes a tuning circuit and a rectifier circuit.

FIG. 6 is a diagram of an exemplary power receiving element 600 that includes a tuning circuit 610 and the rectifier circuit 420. The power receiving element 600 further comprises a resonant circuit 605, a battery or load 690, a driver circuit 625, a rectifier boost control circuit 630, a rectifier buck control circuit 640, and error amplifiers 631, 641, 651, and 652. In some embodiments, the tuning circuit 610 may comprise a variable reactive element (e.g., tuning capacitor, transcap, variable capacitor, variable inductor, etc.). The tuning circuit 610 may be configured to detune the resonant circuit 605 away from resonance or tune the resonant circuit 605 closer to resonance. In some embodiments, the tuning circuit 610 is configured to create a reactance shift of the resonant circuit 605. In some aspects, based of the reactance shift, an impedance of the rectifier may be changed anywhere from close to zero (e.g., at resonance) to close to very negative (e.g., capacitive). In some aspects, the detuning of resonant circuit 605 may beneficially increase a range of output power control when used in combination with the tuning of the rectifier circuit 420 by adjusting the timing or thresholds of the rectifier circuit 420 switches (e.g., S2-S3 and S5-S6) described above.

In some embodiments, the adjustment of the timing or thresholds of the switches S2-S3 and S5-S6 may be controlled by the rectifier boost control circuit 630 and/or the rectifier buck control circuit 640. For example, the rectifier boost control circuit 630 may be configured to increase the output power of the rectifier 420 beyond the tuning circuit 610 maximum value. Additionally, the rectifier buck control circuit 640 may be configured to reduce the output power of the rectifier 420 beyond the tuning circuit 610 detuning capabilities.

In some embodiments, the power receiving element 600 receives certain inputs in order to determine which type of control to use to adjust induced voltage and/or output power. As shown in FIG. 6, the error amplifier 651 receives as inputs a reference current (Iref1), a temperature input, and a resonator voltage input. Typically, among these inputs there is a dominant one (for instance if the current is regulated, then there is a current reference) and the others are secondary inputs. The secondary inputs may become the limiting factor affecting the reference (typically reducing the reference value) only if the parameters assigned to the secondary inputs are above a given threshold. In the alternative, there could be a multiplexer in front of the error amplifier 651 to select the proper parameter from time to time. In some aspects, the error amplifier 651 then determines and outputs a reference current (Iref) or a reference voltage (Vref, not shown) used by error amplifiers 631, 641, and 652 to determine the amount of tuning or delay control, if any, is needed. The fb signal, as shown in FIG. 6, refers to a feedback signal that, depending on the controlled parameter, can be a current, a voltage, a temperature, a resonant voltage, or other parameter feedback. In some aspects, the error amplifier 652 controls the tuning circuit 610 and the fb signal refers to a variable reactive element (e.g. variable capacitor) feedback. In some aspects, two or more of the error amplifiers 631, 641, and 652 may work concurrently. In other aspects, they may function separately. In some embodiments, the error amplifiers 631, 641 and 652 generate an error signal such that their inputs (e.g., current or voltage) track each other, thus regulating the desired parameter.

Figure 7:
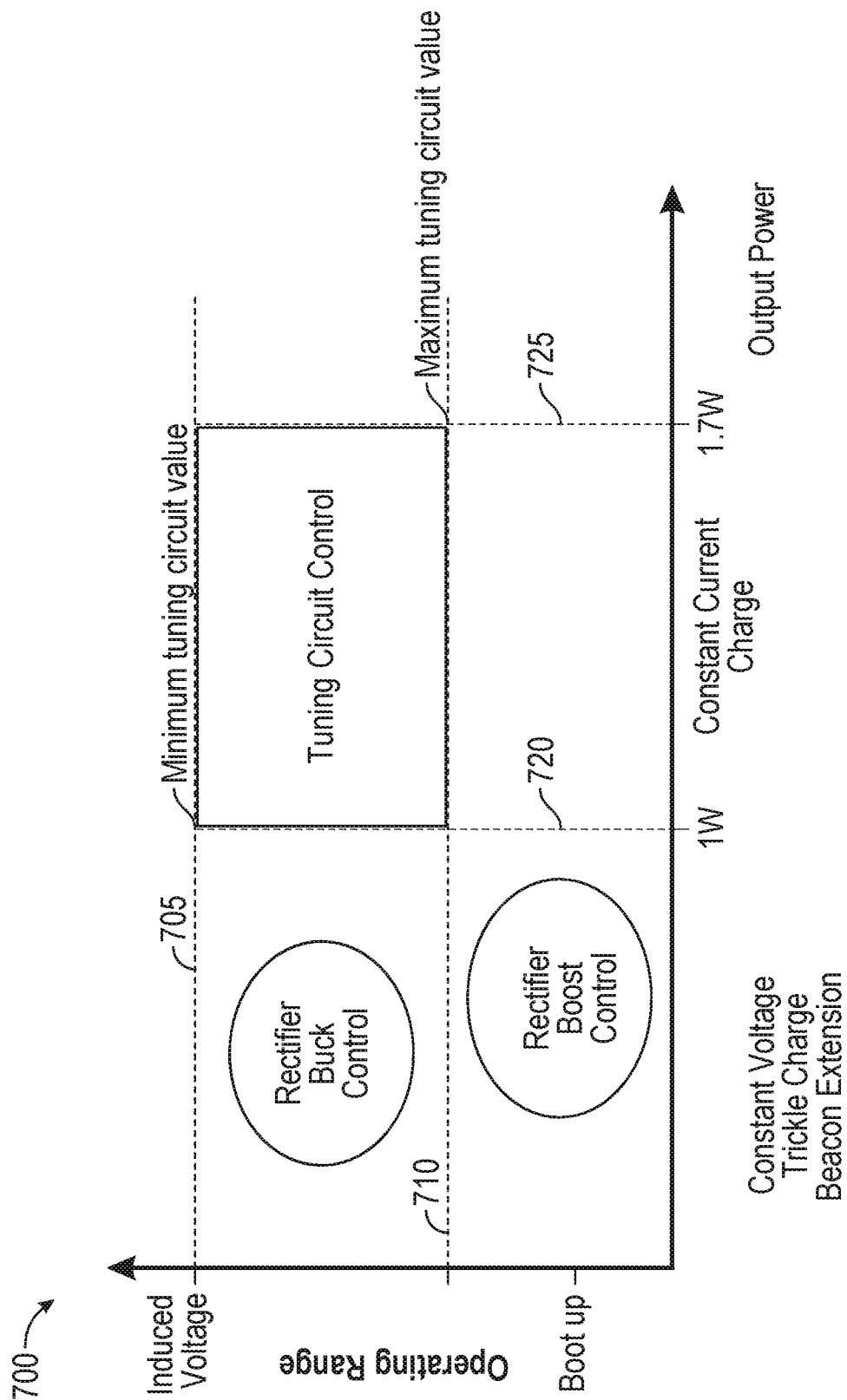
FIG. 7 is a chart of exemplary values of output power and induced voltage and different tuning methods a power receiving element may utilize based on the output power and induced voltage values

FIG. 7 is a chart 700 of exemplary values of output power and induced voltage and different tuning methods the power receiving element 600 may utilize based on output power and induced voltage values. Chart 700 shows values of induced voltage (e.g., voltage source 401) on the y-axis and values of output power (e.g., power to the battery 690). Chart 700 further shows a maximum induced voltage level 705, a minimum induced voltage level 710, a first output power level 720, and a second output power level 725, the second output power level 725 higher than the first output power level 720.

As shown in FIG. 7, at induced voltage levels close to or lower than the minimum induced voltage level 710, the power receiving element 600 may utilize rectifier boost control to increase the induced voltage and/or the output power via the rectifier boost control circuit 630. For example, the rectifier boost control circuit 630 and the rectifier 420 may boost or increase the induced voltage and/or the output power by adjusting the timing or thresholds of the switches S2-S3 and S5-S6. In one aspect, if a voltage level of the battery 690 is close to the end of charge level, the power receiving element 600 may be operating in constant voltage mode and may wish to increase the output power to the battery 690. In one aspect, the rectifier boost control circuit 630 may reduce the hysteresis of turn off timing of the switches S2-S3 and S5-S6 so that less current from the battery 690 flows back into the resonant circuit 605 which may increase the output power.

Additionally, at high induced voltage levels close to or above the maximum induced voltage level 705, the power receiving element 600 may utilize rectifier buck control to reduce the induced voltage and/or the output power via the rectifier buck control circuit 640. For example, if the battery 690 is nearing a full or end of charge (e.g., at high induced voltage levels), the power receiving element 600 may be operating in constant voltage mode and may wish to reduce the output power to close to zero. In some aspects, rectifier buck control circuit 640 delays the turn off timing of the switches S2-S3 and S5-S6 which allows some current to flow back from the battery 690 to the resonant circuit 605 which may reduce the output power. Also shown in FIG. 7, between the maximum induced voltage level 705 and the minimum induced voltage level 710 (e.g., the operating range), the power receiving element 600 may utilize the tuning circuit 610 to control the induced voltage and/or output power of the rectifier 420.

As described above, the tuning circuit 610 may be limited in the amount it may be able adjust the induced voltage and/or output power of the rectifier 402. The minimum value the tuning circuit 610 may adjust the rectifier 420 is illustrated at a point where the maximum induced voltage level 705 and the first output power level 720 intersect. The maximum value the tuning circuit 610 may adjust the rectifier 420 is illustrated at a point where the minimum induced voltage level 710 and the second output power level 725 intersect. Additionally, in a typical charging scenario, during the initial charging of the battery 690, the power receiving element 600 may be operating in a constant current charge mode illustrated between the first and second power levels 720 and 725. In constant current charge mode, the tuning circuit 610 may adjust a value of a variable reactive element to maintain a constant current to the battery 690. After a voltage level in the battery 690 satisfies a threshold, the power receiving element may operate in a constant voltage mode (also referred to as trickle charge or beacon extension mode) between zero and the first power level 720. In constant voltage mode, the rectifier 420 may adjust the timing or thresholds of the switches S2-S3 and S5-S6 to adjust the current and/or output power to maintain a constant voltage at the battery 690. In some aspects, rectifier buck and boost control occurs during the constant voltage mode.

Figure 8:
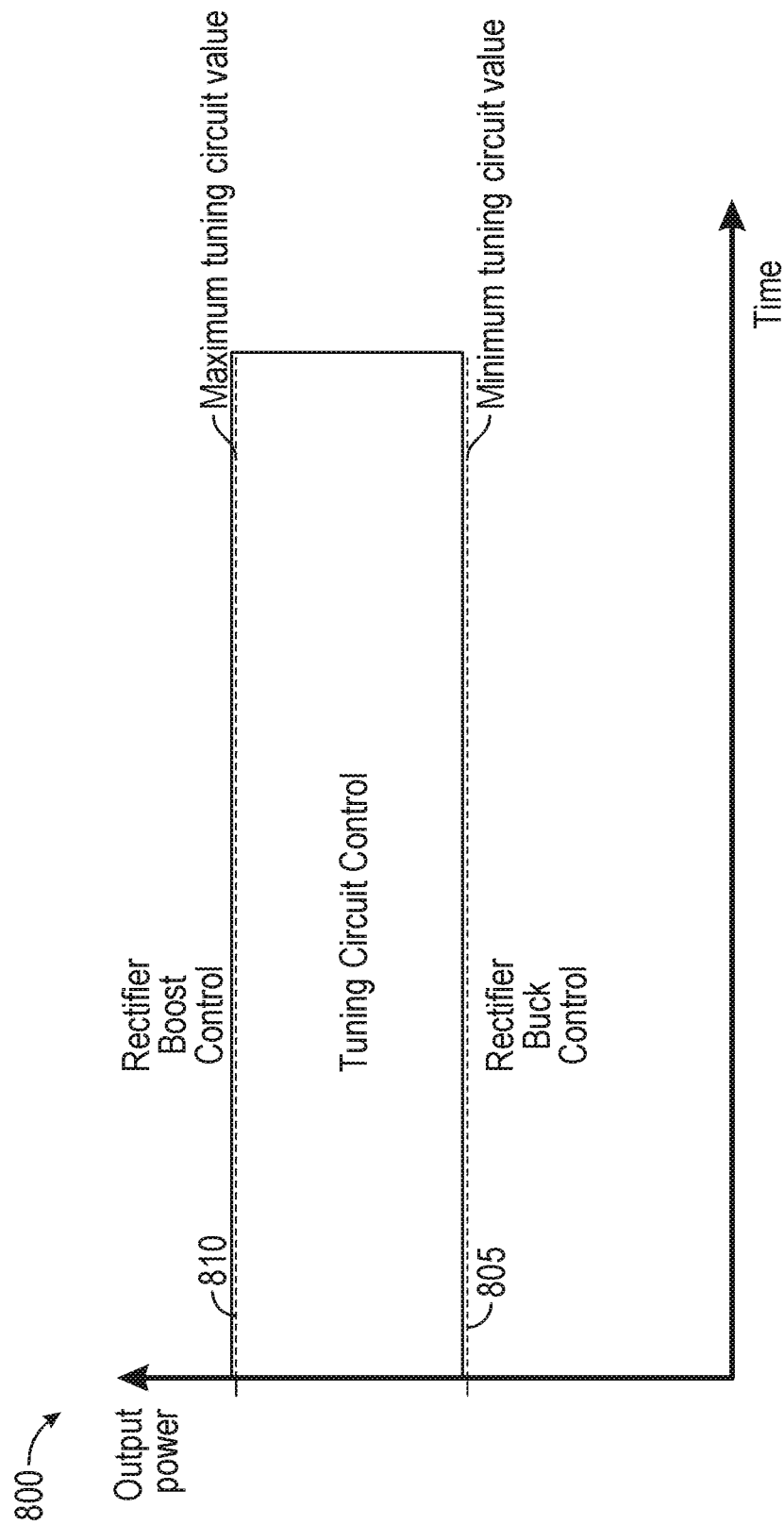
FIG. 8 is a chart illustrating different output power control methods for different output power control levels.

FIG. 8 is a chart 800 illustrating different output power control methods for different output power control levels. Chart 800 shows values of output power on the y-axis and time on the x-axis. FIG. 8 also shows a first output power level 805, represented by a horizontal dashed line, which represents a border of a range for values of output power that are capable of being tuned via the tuning circuit 610 or the rectifier buck control circuit 640. FIG. 8 further comprises a second output power level 810 above the first output power level 805 which represents a border of a range for values of output power that are capable of being tuned via the tuning circuit 610 or the rectifier boost control circuit 630. In some aspects, the first output power level 805 corresponds to the minimum output power level the tuning circuit 610 can tune the output power to. In some aspects, the second output power level 810 corresponds to the maximum output power level the tuning circuit 610 can tune the output power to.

Figure 9:
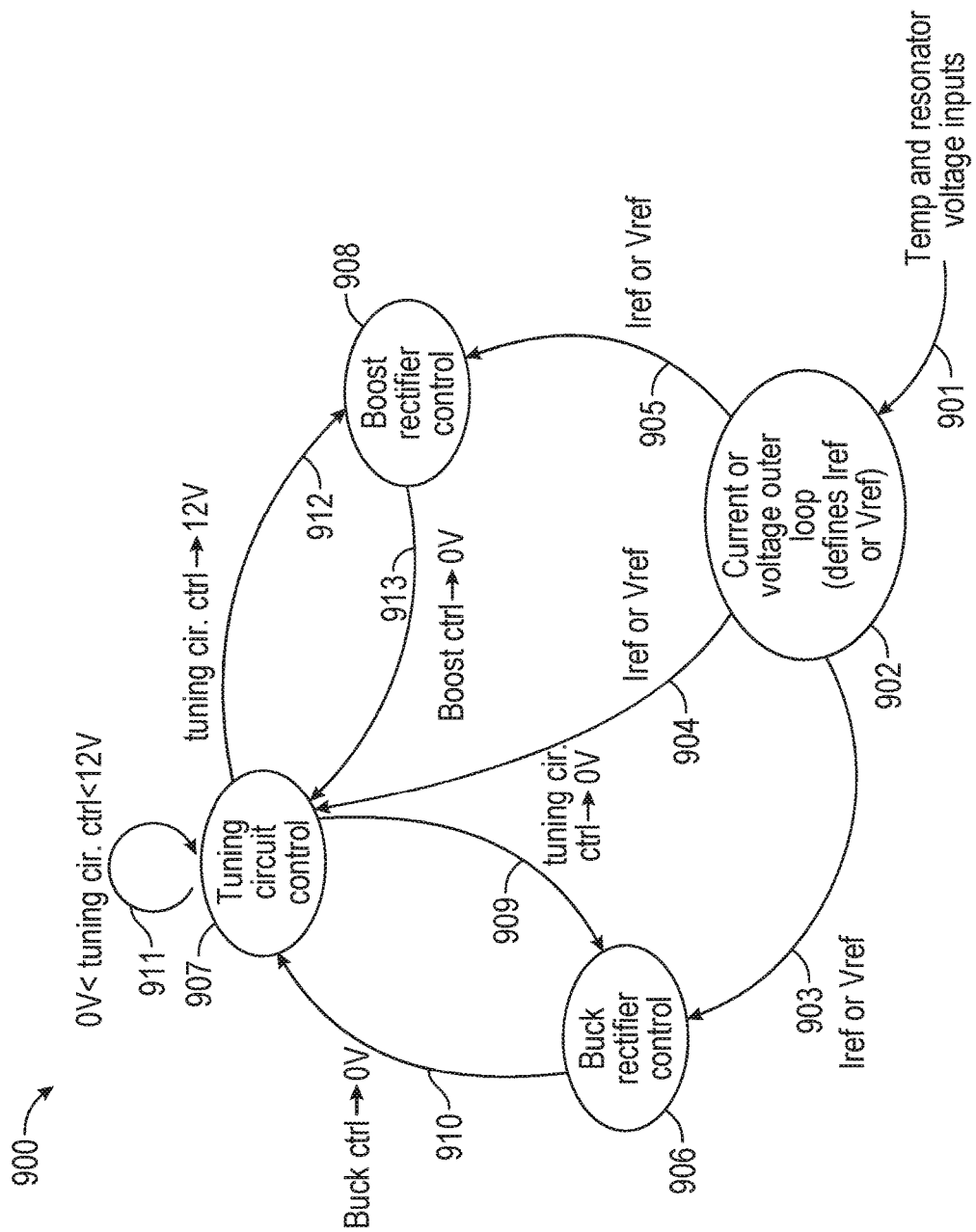
FIG. 9 is a diagram showing different states of voltage and output power control for different power and voltage values.

FIG. 9 is a diagram 900 showing different states of voltage and output power control a power receiving element (e.g., power receiving element 600) may use for different power and voltage values. In some embodiments, the diagram 900 may be implemented by the power receiving elements 400 or 600. At state 902, the error amplifier 651 may receive inputs 901 of the resonant circuit 605, e.g., voltage, temperature, and/or current. In some embodiments, the error amplifier 651 determines a current level ($I_{ref}$) or a voltage level ($V_{ref}$) of the resonant circuit 605 (e.g., outer loop of the power receiving element 600). The value of $I_{ref}$ and/or $V_{ref}$ may then be used to determine which type of control should be implemented. As described above with respect to FIG. 6, the value of $I_{ref}$ and/or $V_{ref}$ is output to each of a buck rectifier control state 906, a tuning circuit control state 907, and a boost rectifier control state 908 as shown by signals 903, 904, and 905, respectively.

With reference to FIGS. 6-7, in some embodiments, the buck rectifier control state 906 may include the rectifier buck control circuit 640 configured to adjust the timing or thresholds of the switches S2-S3 and S5-S6 to reduce a voltage level and/or output power level. Such a reduction may beyond a reduction capable by the tuning circuit 610. In some embodiments, the rectifier buck control circuit 640 may adjust non-zero current value for the switch to turn off. For example, the rectifier buck control circuit 640 may be configured to actuate one or more of the switches S2-S3 and S5-S6 when a current through the switch satisfies a non-zero current value. In some aspects, the rectifier buck control circuit 640 may adjust the non-zero current value from a first value to a second value, the second value being smaller than the first value. For example, the non-zero current value may be adjusted from −5 mA to −200 mA. Such an adjustment increases the amount of current that flows from the battery 690 back into the resonant circuit 605 and reduces the output power.

In another example, if the battery 690 is nearing a full or end of charge (e.g., at high induced voltage levels), the power receiving element 600 may be operating in constant voltage mode and may wish to reduce the output power to close to zero. With reference to FIG. 7, the turning circuit control state 907, via the tuning circuit 610 may only be able to reduce the output power to the first power level 720 (e.g., 1 W) and the buck rectifier control state 906 may be used in conjunction with the tuning circuit control state 907 to further reduce the output power to close to zero. This combination of tuning control allows the power receiving element 600 to extend the range of output power control without significant efficiency loss. As shown in FIG. 9, the power receiving element 600 may transition from using tuning circuit control 907 to the buck rectifier control state 906. For example as shown by transition 909, if the power receiving element 600 wishes to reduce a voltage or power level to beyond the tuning circuit control state 907 capabilities (e.g., close to 0V), it may transition to buck rectifier control state 906 to further reduce the voltage or power level. Similarly, the power receiving element 600 may transition from using the buck rectifier control state 906 to the tuning circuit control state 907. For example as shown by transition 910, when the buck rectifier control state 906 approaches 0V (e.g., no longer needs to reduce the voltage and/or power level), the power receiving element 600 transitions from the buck rectifier control state 906 to the tuning circuit control state 907 since the desired control is within the tuning circuit control state 907 capabilities.

In some aspects, during a constant current mode, the power receiving element 600 may operate solely in the tuning circuit control state 907 via the tuning circuit 610. With reference to FIGS. 6-7, in the tuning circuit control state 907, the tuning circuit 610 may adjust a value of a variable reactive component (e.g., tuning capacitor, transcap, variable capacitor, variable inductor, etc.) to adjust the output power within a certain range (e.g., between 1 W and 1.7 W). The power receiving element 600 may determine as shown at signal 911 whether the output power level or voltage level stays within the desired range, and if so, will continue using tuning circuit control state 907 to control tuning of the power receiving element 600.

With reference to FIGS. 6-7, in some embodiments, the boost rectifier control state 908 may include the rectifier boost control circuit 630 configured to adjust the timing or thresholds of the switches S2-S3 and S5-S6 to increase a voltage level and/or output power level. Such an increase may extend beyond an increase of the voltage and/or output power level capable by the tuning circuit 610. For example, if a voltage level of the battery 690 is close to the end of charge level, the power receiving element 600 may be operating in constant voltage mode and may wish to increase the output power to the battery 690. With reference to FIG. 7, the tuning circuit control state 907, via the tuning circuit 610 may only be able to increase the output power to the from the first power level 720 to the second power level 725 (e.g., 1-1.7 W) and the boost rectifier control state 908 may be used in conjunction with the tuning circuit control state 907 to further increase the capability of the power receiving element 600 to increase output power from values below the first power level 720 to values within the capabilities of the tuning circuit control state 907. This combination of tuning control allows the power receiving element to extend the range of output power control without significant efficiency loss. As shown in FIG. 9, the power receiving element 600 may transition from the tuning circuit control state 907 to the boost rectifier control state 908 when it wishes to increase a voltage or power level to a level beyond the capabilities of the tuning circuit control state 907. For example as shown in transition 912, if the tuning circuit control state 907 approaches its maximum voltage level (e.g., 12V) and the power receiving element 600 or the battery 690 requests more power or voltage, then the power receiving element 600 will further utilize the boost rectifier control state 908 to increase the voltage/power level delivered to the load (e.g., battery 690). Similarly, when the boost rectifier control state 908 is no longer needed (e.g., boost voltage approaches zero as shown by transition 913), the power receiving element 600 may transition from the boost rectifier control state 908 to the tuning circuit control state 907 since the desired control is within the tuning circuit control state 907 capabilities.

Figure 10:
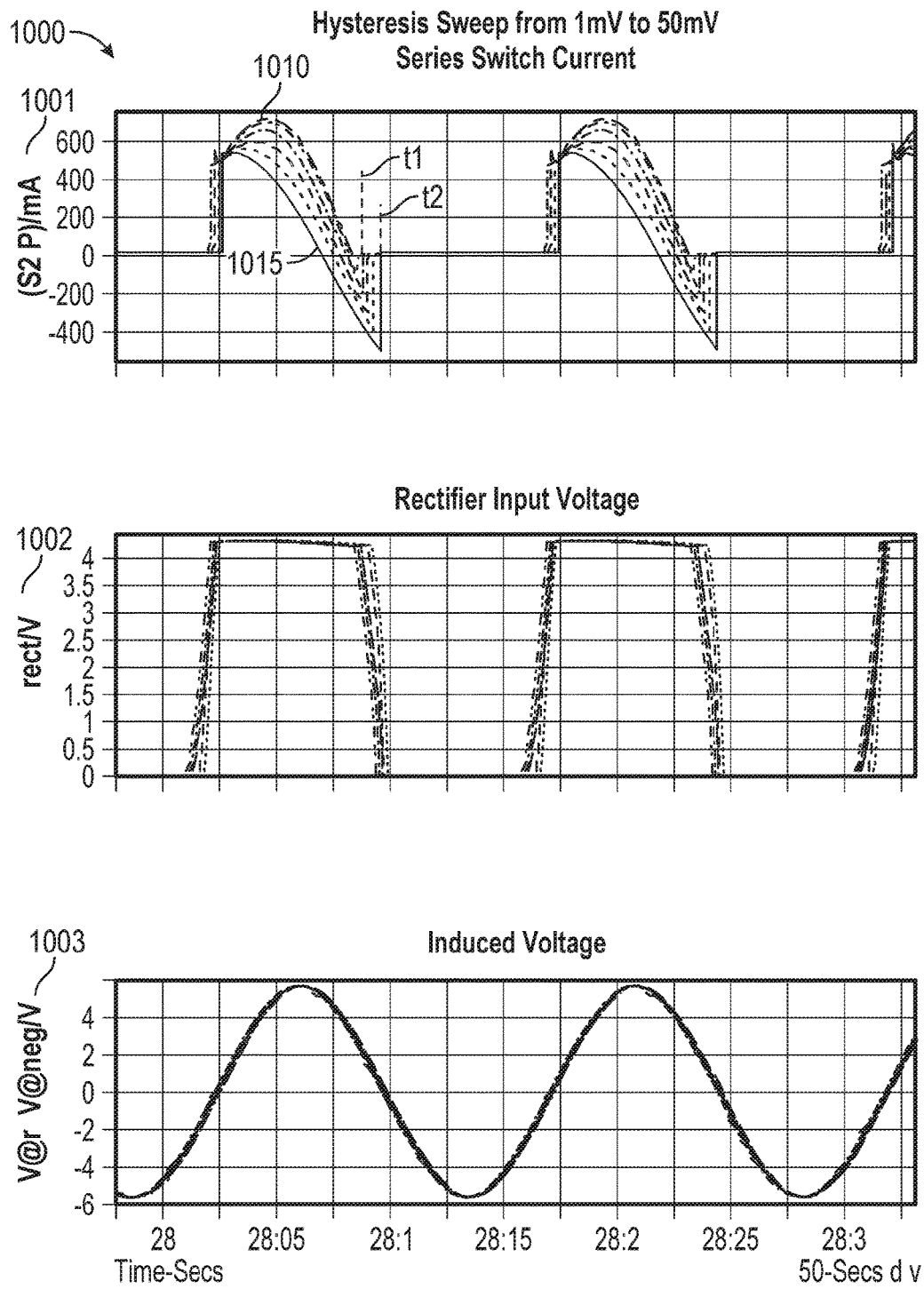
FIG. 10 is a chart of exemplary outputs of a switch current, a rectifier input voltage, and an induced voltage for different hysteresis values.

FIG. 10 is a chart 1000 of exemplary outputs of a switch current, a rectifier input voltage, and an induced voltage for different hysteresis values. Chart 1000 comprises three different waveforms 1001-1003 for different hysteresis values ranging from 1 mV to 50 mV. The upper waveform 1001 represents the current in the switch (e.g., S2 of FIG. 4). The middle waveform 1002 represents the rectifier input voltage (e.g., voltage across terminals "rect" 430 and "rectb" 431 of FIG. 4). The lower waveform 1003 represents the induced voltage (e.g., voltage across terminals "rx" 417 and "neg" 419 of FIG. 4). As shown, as the hysteresis increases, the current at turn off reverses earlier (e.g., gets more negative) and the shift of the peak of the current with respect to the lower waveform 1003 (induced voltage waveform) decreases and moves more to the left. Thus, at the time of turning off the switch S2, current (and power) is flowing from the load or battery (e.g., battery 236 of FIG. 2) back into the resonating circuit.

For example, curve 1010 of the upper waveform 1001 represents the current for the switch with a hysteresis of 1 mV and curve 1015 of the upper waveform represents the current for the switch with a hysteresis of 50 mV. In curve 1010, at time $t_1$ when the switch S2 is turned off, the current through the switch S2 is approximately −50 mA. In curve 1015, at time $t_2$ when the switch S2 is turned off, the current through the switch S2 is approximately −450 mA. Additionally, curve 1010 shows a peak current value of approximately 700 mA while curve 1015 shows a peak current value of approximately 550 mA. As shown, $t_2 > t_1$ which demonstrates the effective increased delay in turning off the switch S2 as the hysteresis is increased.

In some embodiments, adding a hysteresis effect or shifting the phase of the current of a rectifier as described above may have various effects depending on the conditions of the power receiving element 400 and on the rest of the resonating circuit. At low induced voltage levels, and in particular when the output (e.g., battery 236 of FIG. 2) voltage is relatively high with respect to the induced voltage (battery voltage higher than the root-mean-square (rms) value of the induced voltage), if adjusting the output power by adjusting a timing of the switches described above is used in combination with the variable capacitor technology, the capacitance value may be configured such that the resonant circuit of the power receiving element 400 is operating at resonance or very close to resonance. In that case, the impedance seen, looking into the rectifier, may be capacitive and the lower the induced voltage, the more capacitive the impedance.

Figure 11:
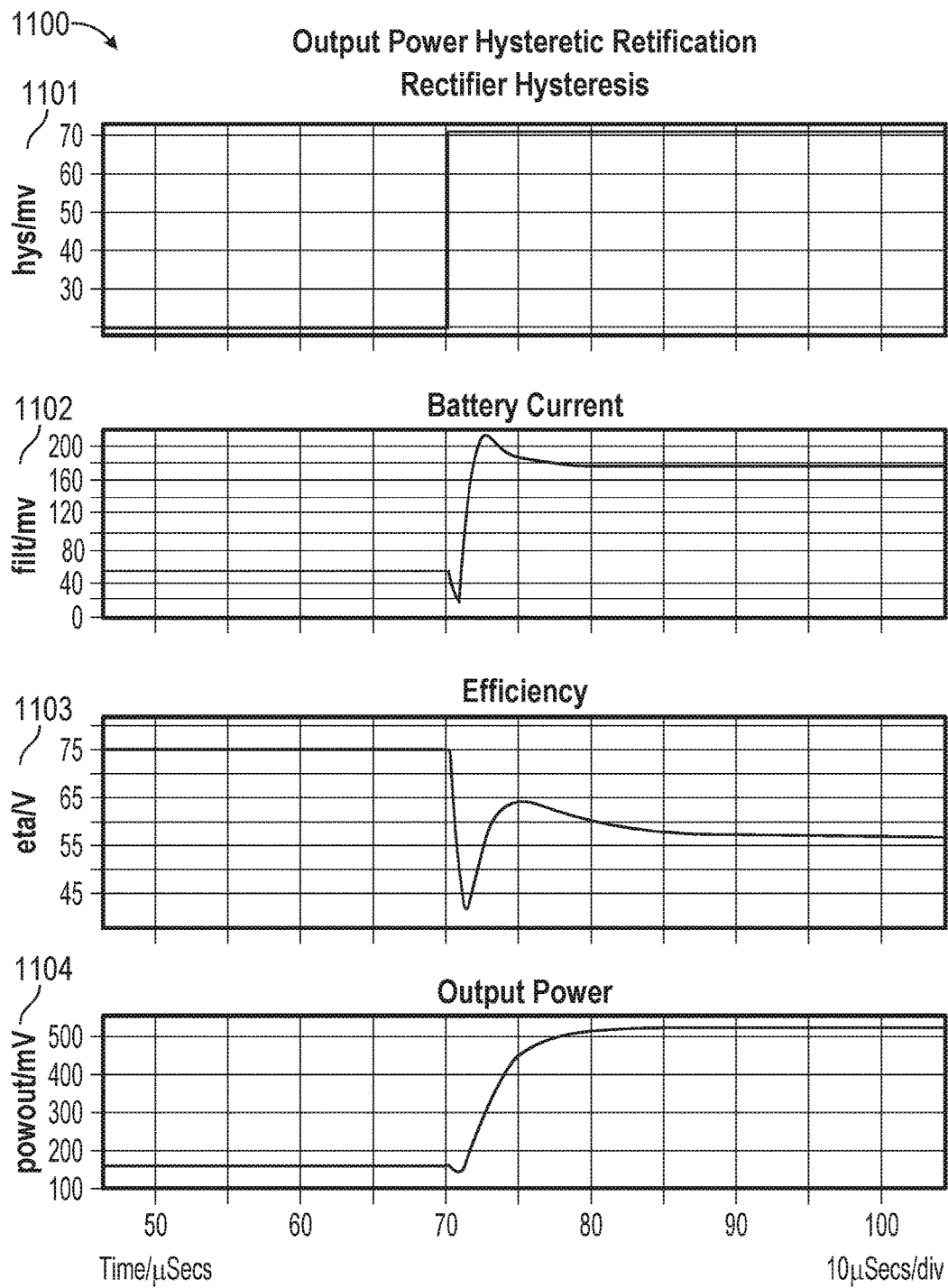
FIG. 11 is a chart showing exemplary outputs of a rectifier hysteresis, a battery current, an efficiency of the system, and an output power for different hysteresis values.

At low induced voltages (with respect to the output voltage), increasing the hysteresis of a switch may increase the amount of output power to the load. FIG. 11 is a chart 1100 showing exemplary outputs of a rectifier hysteresis, a battery current, an efficiency of the system, and an output power for different hysteresis values. Chart 1100 comprises four different waveforms 1101-1104 for these outputs when a hysteresis value of the comparator 550 changing from 20 mV to 70 mV. The upper waveform 1101 represents the hysteresis value of a comparator (e.g., comparator 550 of FIG. 5). The next lower waveform 1102 represents the current in the load or battery (e.g., battery 236 of FIG. 2). The next lower waveform 1103 represents the efficiency of the wireless power transfer system (e.g., wireless power transfer system 200 of FIG. 2). The bottom waveform 1104 represents the output power delivered to the load or battery (e.g., battery 236 of FIG. 2). As shown in chart 1100, when the hysteresis changes from 20 mV to 70 mV, the battery current and output power increases while the efficiency of the system decreases. While system efficiency may decrease as a result of the increased hysteresis (e.g., inverse relationship), in some aspects the decrease in efficiency is overcome by the benefits of the increased output power (e.g., for operating during a period of a low power beacon output from a transmitter for establishing a charging connection).

In some aspects, the adjusting the hysteresis of the rectifier 420 may be accomplished by means of an analog loop, a separate controller, or by pulses to adjust a slope of change in the hysteresis. In other aspects, adjusting the hysteresis of the rectifier 420 or adjusting the timing of one or more of the switches S2-S3 and S5-S6 may be accomplished by any other means in accordance with the embodiments described herein.

In some embodiments, when the resonant circuit of the power receiving element 400 is at resonance, and has an induced voltage higher or equal to the output voltage, the phase shift from a hysteresis, or adjustment of the timing of one or more of the switches S2-S3 and S5-S6, may be negligible and the effect on the output power may be almost null as well.

Figure 12:
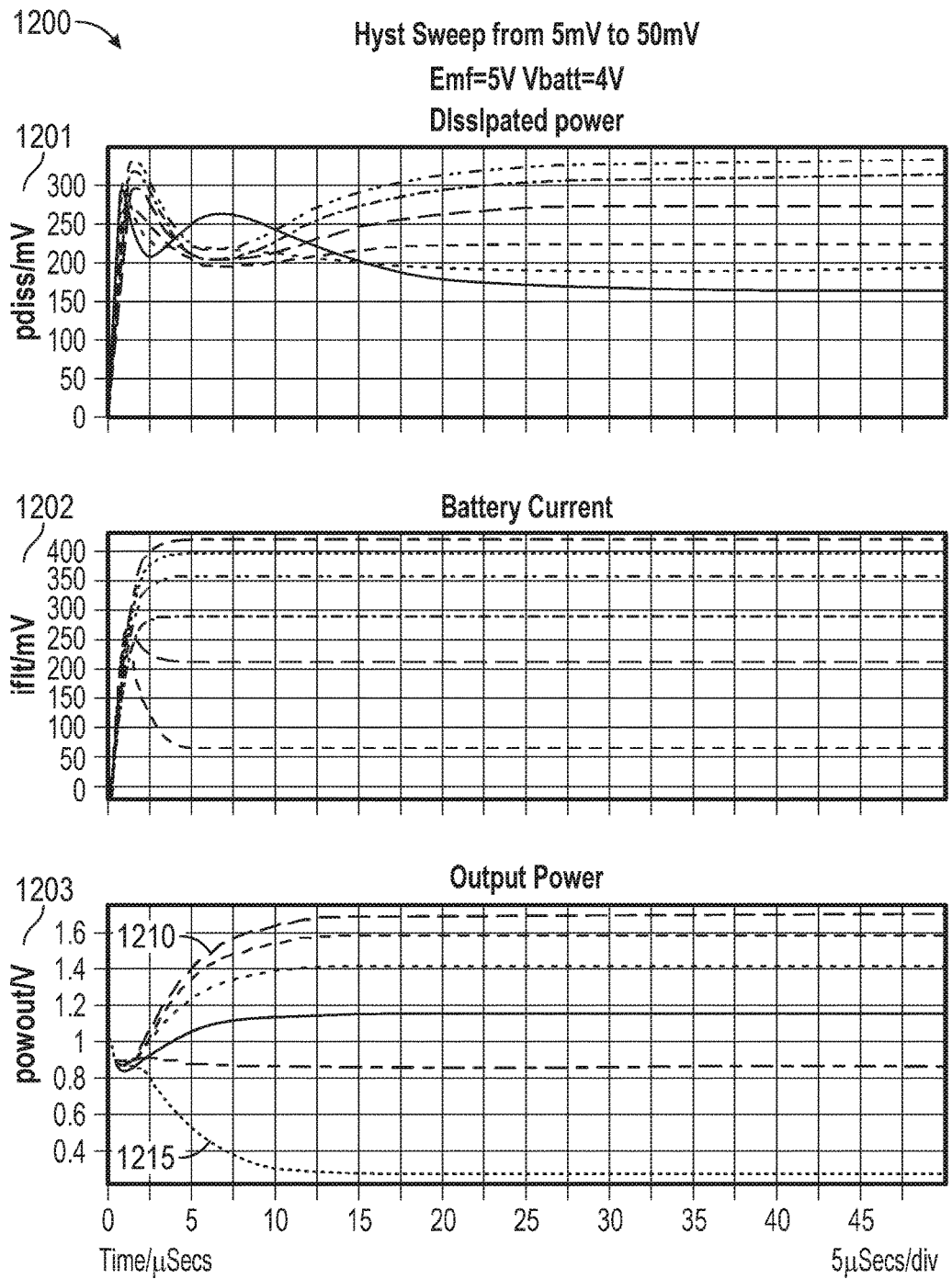
FIG. 12 is a chart showing exemplary outputs of a dissipated power, a battery current, and an output power for different hysteresis values.

FIG. 12 is a chart 1200 showing exemplary outputs of a dissipated power, a battery current, and an output power for different hysteresis values. Chart 1200 comprises three different waveforms 1201-1203 for these outputs for different hysteresis values ranging from 5 mV to 50 mV. The upper waveform 1201 represents a dissipated power in the system. The middle waveform 1202 represents the current in the load or battery (e.g., battery 236 of FIG. 2). The lower waveform 1203 represents the output power delivered to the load or battery (e.g., battery 236 of FIG. 2). As shown in chart 1200, as the hysteresis increases, the current in the battery decreases and the output power decreases as shown in waveforms 1202 and 1203. For example, in waveform 1203, curve 1210 shows an output power of approximately 1.7 W for a hysteresis of 5 mV and curve 1215 shows an output power of approximately 250 mW for a hysteresis of 50 mV. Additionally, as shown in waveform 1201, the reduction of output power from 1.7 W down to 250 mW may be accomplished without dissipating a large amount of power. Thus, adjusting the switch timing or adding a hysteresis in a wireless power transfer system, may have the benefit of extending the tuning effects both when more output power is desired (e.g., at low induced voltage levels) and when less power is desirable, as is the case of constant voltage mode of operation (e.g., at high induced voltage levels).

Additionally, this increased range of tuning may be cost-effective in that shifting the phase of the current does not require extra components and may reduce the cost of tuning resonant circuits. Furthermore, adjusting the switch timing or adding a hysteresis in a wireless power transfer system does not increase the voltage rating of the rectifier's elements nor of any other component. In some embodiments, the control of the rectifier switches to adjust an output power described herein may be used to eliminate or reduce effects of component value variations due to tolerance of components. This rectifier control could also be used to control the output power with boot up induced voltage levels making the long beacon extension practical. This rectifier control could also be used to control the maximum voltage occurring at the resonator terminals. Moreover, regulating output power levels via the rectifier 420 may allow for an implementation of a power receiving element without a DC-to-DC converter.

In some aspects, the use of a hysteresis may have an effect on electromagnetic interference (EMI) and harmonic content. The examples and embodiments discussed herein may also be extended to closed loop circuits. The examples and embodiments discussed herein may be applied to both resonant and non-resonant circuits and systems.

Figure 13:
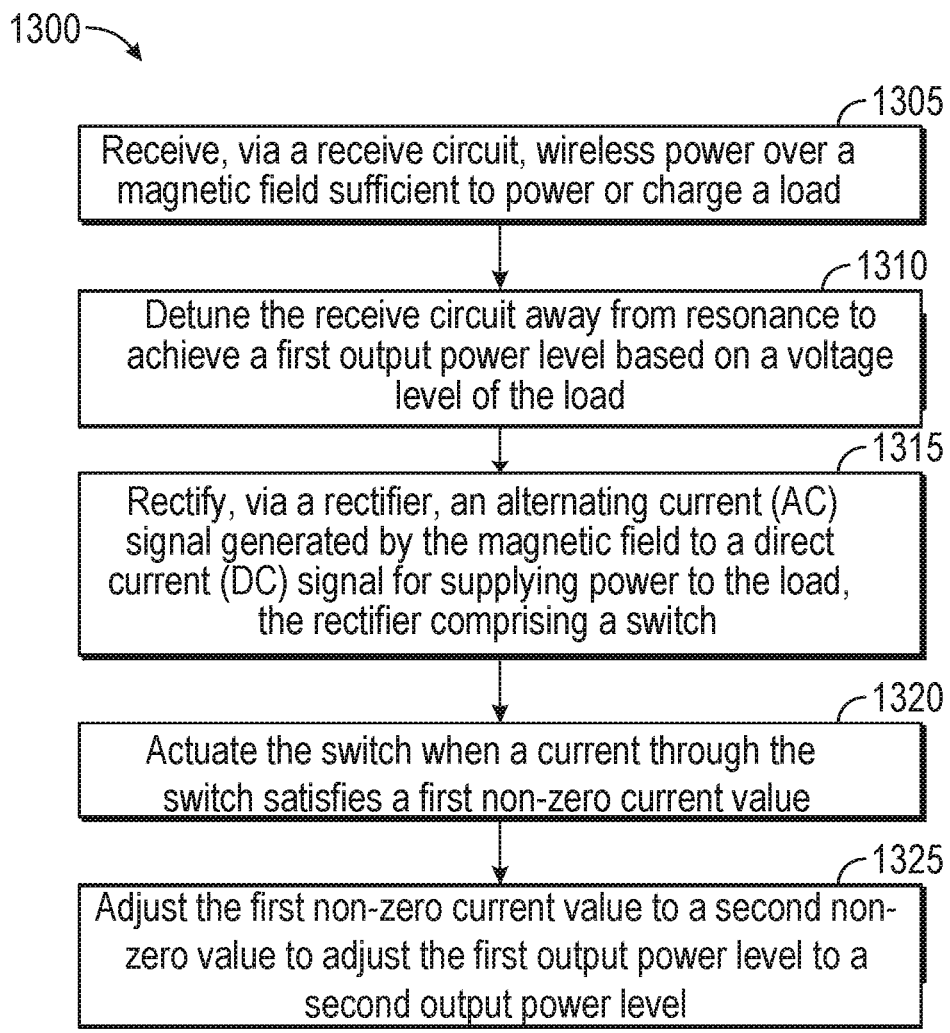
FIG. 13 is a flowchart of an exemplary method of receiving wireless power, in accordance with the disclosure herein.

FIG. 13 is a flowchart of an exemplary method 1300 of receiving wireless power, in accordance with the disclosure herein. The method shown in FIG. 13 may be implemented via one or more devices in the wireless power transfer system 100 similar to the power receiving element 118, the power receiving element 218, the receive circuitry 350, the power receiving element 400, the power receiving element 600, and the switch circuitry 500 of FIGS. 1-6. Although the method 1300 is described herein with reference to a particular order, in various implementations, blocks herein may be performed in a different order, or omitted, and additional blocks may be added.

At block 1305, the power receiving element receives, via a receive circuit, wireless power via a magnetic field sufficient to power or charge a load. At block 1310, the power receiving element detunes, via a tuning circuit comprising a variable reactive element and coupled to the receive circuit, the receive circuit away from a resonant frequency to achieve a first output power level based on a voltage level of the load. At block 1315, power receiving element rectifies, via a rectifier, an alternating current (AC) signal generated by the magnetic field to a direct current (DC) signal for supplying power to the load, the rectifier comprising a switch. At block 1320, the power receiving element actuates the switch when a current through the switch satisfies a first non-zero current value. At block 1325, the power receiving element adjusts the first non-zero current value to a second non-zero value to adjust the first output power level to a second output power level.

The various operations of methods described above may be performed by any suitable means capable of performing the operations, such as various hardware and/or software component(s), circuits, and/or module(s). Generally, any operations illustrated in the Figures may be performed by corresponding functional means capable of performing the operations.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. The described functionality may be implemented in varying ways for each particular application, but such implementation decisions should not be interpreted as causing a departure from the scope of the embodiments of the invention.

The various illustrative blocks, modules, and circuits described in connection with the embodiments disclosed herein may be implemented or performed with a general purpose processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm and functions described in connection with the embodiments disclosed herein may be embodied directly in hardware, in a software module executed by a processor, or in a combination of the two. If implemented in software, the functions may be stored on or transmitted over as one or more instructions or code on a tangible, non-transitory computer-readable medium. A software module may reside in Random Access Memory (RAM), flash memory, Read Only Memory (ROM), Electrically Programmable ROM (EPROM), Electrically Erasable Programmable ROM (EEPROM), registers, hard disk, a removable disk, a CD ROM, or any other form of storage medium known in the art. A storage medium is coupled to the processor such that the processor can read information from, and write information to, the storage medium. In the alternative, the storage medium may be integral to the processor. Disk and disc, as used herein, includes compact disc (CD), laser disc, optical disc, digital versatile disc (DVD), floppy disk and blu ray disc where disks usually reproduce data magnetically, while discs reproduce data optically with lasers. Combinations of the above should also be included within the scope of computer readable media. The processor and the storage medium may reside in an ASIC. The ASIC may reside in a user terminal. In the alternative, the processor and the storage medium may reside as discrete components in a user terminal.

For purposes of summarizing the disclosure, certain aspects, advantages and novel features of the inventions have been described herein. It is to be understood that not necessarily all such advantages may be achieved in accordance with any particular embodiment of the invention. Thus, the invention may be embodied or carried out in a manner that achieves or optimizes one advantage or group of advantages as taught herein without necessarily achieving other advantages as may be taught or suggested herein.

Various modifications of the above described embodiments will be readily apparent, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. An apparatus for wirelessly receiving power, the apparatus comprising:
   a receive circuit configured to receive wireless power via a magnetic field sufficient to power or charge a load;
   a tuning circuit comprising a variable reactive element, coupled to the receive circuit, and configured to detune the receive circuit away from a resonant frequency to adjust an output power level to a first output power level;
   a rectifier electrically coupled to the receive circuit and configured to rectify an alternating current (AC) signal, generated in the receive circuit, to a direct current (DC) signal for supplying power to the load, the rectifier comprising a switch; and
   a drive circuit configured to:
   determine when a measured current value of the AC signal through the switch is equal to a first non-zero current value;
   actuate the switch based on the determination that the measured current value of the AC signal through the switch is equal to the first non-zero current value; and
   adjust the first non-zero current value to a second non-zero value to adjust the first output power level to a second output power level.

2. The apparatus of claim 1, wherein the variable reactive element comprises a variable capacitor.

3. The apparatus of claim 1, wherein the drive circuit is further configured to actuate the switch based on a hysteresis effect.

4. The apparatus of claim 3, wherein the hysteresis effect comprises a delay in turning off the switch.

5. The apparatus of claim 1, wherein the second non-zero current value is a negative current value such that a direction of the current flows from the load into the receive circuit.

6. The apparatus of claim 1, wherein the drive circuit further comprises a comparator configured to measure the current value of the AC signal through the switch.

7. The apparatus of claim 1, wherein the drive circuit further comprises a current sensor configured to sense the current value of the AC signal through the switch.

8. The apparatus of claim 1, wherein the first non-zero current value is lower than the second non-zero current value and the first output power level is lower than the second output power level.

9. The apparatus of claim 8, wherein a voltage generated in the receive circuit is less than a voltage level provided to the load.

10. The apparatus of claim 1, wherein the first non-zero current value is lower than the second non-zero current value and the first output power level is higher than the second output power level.

11. The apparatus of claim 10, wherein a voltage generated in the receive circuit is equal to or greater than a voltage level provided to the load.

12. The apparatus of claim 1, wherein the tuning circuit is further configured to generate a reactance shift in the receive circuit.

13. The apparatus of claim 1, wherein the second output power level exceeds a power level the tuning circuit is capable of achieving.

14. The apparatus of claim 13, wherein the second output power level is lower than the first output power level.

15. The apparatus of claim 13, wherein the second output power level is higher than the first output power level.

16. The apparatus of claim 1, wherein the tuning circuit is further configured to detune the receive circuit away from the resonant frequency to achieve the first output power level based on a reference voltage level or a reference current level of the receive circuit.

17. The apparatus of claim 16, wherein the reference voltage level or the reference current level is based on one or more of a voltage, a temperature, and a current of the receive circuit.

18. A method of receiving wireless power, comprising:
   receiving, via a receive circuit, wireless power via a magnetic field sufficient to power or charge a load;
   detuning, via a variable reactive element coupled to the receive circuit, the receive circuit away from a resonant frequency to adjust an output power level to a first output power level;
   rectifying, via a rectifier, an alternating current (AC) signal generated by the magnetic field to a direct current (DC) signal for supplying power to the load, the rectifier comprising a switch;

determining when a measured current value of the AC signal through the switch is equal to a first non-zero current value;

actuating the switch based on the determination that the measured current value of the AC signal through the switch is equal to the first non-zero current value; and adjusting the first non-zero current value to a second non-zero value to adjust the first output power level to a second output power level.

19. The method of claim 18, wherein actuating the switch comprises actuating the switch based on a hysteresis effect.

20. The method of claim 18, wherein the second non-zero current value is a negative current value such that a direction of the current flows from the load into the receive circuit.

21. The method of claim 18, wherein first non-zero current value is lower than the second non-zero current value and the first output power level is lower than the second output power level.

22. The method of claim 21, wherein a voltage generated in the receive circuit is less than a voltage level provided to the load.

23. The method of claim 18, wherein the first non-zero current value is lower than the second non-zero current value and the first output power level is higher than the second output power level.

24. The method of claim 23, wherein a voltage generated in the receive circuit is equal to or greater than a voltage level provided to the load.

25. An apparatus for wirelessly receiving power, the apparatus comprising:

means for receiving wireless power via a magnetic field sufficient to power or charge a load;

means for detuning the receiving means away from a resonant frequency to adjust an output power level to a first output power level;

means for rectifying an alternating current (AC) signal generated by the magnetic field to a direct current (DC) signal for supplying power to the load, the means for rectifying comprising means for switching; and means for driving the switching means, the driving means configured to:

determine when a measured current value of the AC signal through the switching means is equal to a first non-zero current value, actuate the switching means based on the determination that the measured current value of the AC signal through the switching means is equal to the first non-zero current value, and adjust the first non-zero current value to a second non-zero value to adjust the first output power level to a second output power level.

26. The apparatus of claim 25, wherein the driving means is further configured to actuate the switching means based on a hysteresis effect.

27. The apparatus of claim 25, wherein the first non-zero current value is lower than the second non-zero current value and the first output power level is lower than the second output power level.

28. The apparatus of claim 27, wherein a voltage generated in the receiving means is less than a voltage level provided to the load.

29. The apparatus of claim 25, wherein the first non-zero current value is lower than the second non-zero current value and the first output power level is higher than the second output power level.

30. The apparatus of claim 29, wherein a voltage generated in the receiving means is equal to or greater than a voltage level provided to the load.

* * * * *